US012493258B2

(12) United States Patent
Michishita

(10) Patent No.: US 12,493,258 B2
(45) Date of Patent: Dec. 9, 2025

(54) PRINTING SYSTEM INCLUDING A STATIC-CONTROL APPARATUS, METHOD FOR CONTROLLING PRINTING SYSTEM, AND STORAGE MEDIUM

(71) Applicant: CANON KABUSHIKI KAISHA, Tokyo (JP)

(72) Inventor: Takumi Michishita, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/649,318

(22) Filed: Apr. 29, 2024

(65) Prior Publication Data

US 2024/0369955 A1 Nov. 7, 2024

(30) Foreign Application Priority Data

May 1, 2023 (JP) ................................ 2023-075693

(51) Int. Cl.
*G03G 15/00* (2006.01)
*B65H 37/00* (2006.01)

(52) U.S. Cl.
CPC ......... *G03G 15/5016* (2013.01); *B65H 37/00* (2013.01); *B65H 2301/5133* (2013.01); *B65H 2515/805* (2013.01); *B65H 2551/20* (2013.01); *G03G 2215/00776* (2013.01)

(58) Field of Classification Search
CPC .......... G03G 15/5016; G03G 15/5045; G03G 15/6535; G03G 15/6573; B65H 37/00
See application file for complete search history.

(56) References Cited

U.S. PATENT DOCUMENTS

2014/0363181 A1* 12/2014 Michishita ......... G03G 15/1665 399/45
2018/0081317 A1* 3/2018 Kasuga .............. G03G 15/6582
2024/0353786 A1* 10/2024 Iwasaki .............. G03G 15/5016

FOREIGN PATENT DOCUMENTS

JP H11258881 A 9/1999

* cited by examiner

*Primary Examiner* — Hoang X Ngo
(74) *Attorney, Agent, or Firm* — Canon U.S.A., Inc. IP Division

(57) ABSTRACT

There is provided a system for performing static electricity elimination properly in a case where there is a change in humidity. A method for controlling a printing system includes printing an image on a sheet, performing static electricity elimination on the sheet with the image printed on the sheet, detecting humidity, and notifying a user to change a setting value of the static electricity elimination in a case where the detected humidity has changed.

9 Claims, 8 Drawing Sheets

PRINTING SYSTEM INCLUDING A STATIC-CONTROL APPARATUS, METHOD FOR CONTROLLING PRINTING SYSTEM, AND STORAGE MEDIUM

BACKGROUND

Field of the Disclosure

The present disclosure relates to a printing system, a method for controlling the printing system, and a storage medium.

Description of the Related Art

Recording media (hereinafter, referred to as "sheets") for use in printing operations are conveyed in a statically charged state formed by residual charge during an electrophotographic process or slight friction on conveyance rollers and guides during sheet conveyance. This static electricity may cause the sheets to stick together. Further, dust or paper particles may attach to a deliverable, which causes a decrease in quality of the deliverable.

Plain paper has a low electrical resistance, and charge can move easily in the paper, so that an amount of static charge is small and the static charge can be quickly removed. On the other hand, sheets that use a synthetic resin (plastic) such as thick paper, synthetic paper, or coated paper have a high electrical resistance, and charge is less likely to move in the paper. Thus, the sheets such as synthetic paper and coated paper are often charged and retain charge easily. Further, the sheets are often affected by an environment, particularly humidity, and it is commonly known that the lower the humidity in the environment, the more easily the sheets are charged with static electricity due to a decrease in discharge amount into the air.

Performing post-processing on sheets that are sticking together may affect sheet alignment processing, and not only the post-processing may decrease in quality but also a jam may occur due to paper feed/conveyance failure during the post-processing, which may damage the sheets or the device.

To reduce the foregoing risks, it is desirable to eliminate static electricity on a sheet after printing before the post-processing is performed. Therefore, a method for neutralizing charge on a sheet by applying voltage to a pair of conveyance rollers situated downstream in a sheet conveyance direction has been discussed (refer to Japanese Patent Application Laid-Open No. 11-258881).

A component (hereinafter, referred to as "static electricity elimination roller") that applies the voltage to the conveyance rollers cancels static electricity by applying a charge opposite to a charge on a sheet to the sheet via the static electricity elimination roller to thereby eliminate the static electricity. Thus, the static electricity elimination (the application of the charge opposite to the charge on the sheet to the static electricity elimination roller) by the static electricity elimination roller needs to be controlled based on the amount of static charge on the sheet. In other words, there is an optimal charge adjustment value for static electricity elimination for each print environment, such as humidity or each sheet type. An installation environment of an image forming apparatus varies depending on the country or region, and humidity may change significantly depending on the time of use, weather, and season.

An appropriate charge adjustment value for static electricity elimination varies depending on not only the print environment, such as humidity, and the sheet type but also a length of a sheet conveyance path from sheet feed to sheet discharge. Thus, an appropriate charge adjustment value for the same sheet type may change in a case where there is a change in main body configuration.

In a state where an inappropriate charge adjustment value is set, performing the static electricity elimination control on a sheet may induce static electricity, and this may cause more sheets to stick together and may generate deliverables that will become waste paper.

SUMMARY

To achieve the above-described objective, according to an aspect of the present disclosure, a printing system includes a printing device configured to print an image on a sheet, a static electricity elimination device configured to perform static electricity elimination on the sheet with the image printed on the sheet by the printing device, a sensor configured to detect humidity, at least one memory that stores instructions, and at least one processor. The at least one processor causes, by executing the instructions, the printing system to notify a user to change a setting value of the static electricity elimination by the static electricity elimination device in a case where the humidity detected by the sensor has changed.

Further features of various embodiments will become apparent from the following description of exemplary embodiments with reference to the attached drawings.

DESCRIPTION OF THE EMBODIMENTS

Various exemplary embodiments of the present disclosure will be described in detail below with reference to the drawings. It should be noted that the exemplary embodiments described below are not intended to limit the scope of the claims and that not all combinations of features described in the exemplary embodiments are always essential to a technical solution of every embodiment.

Hardware Configuration

Figure 1:
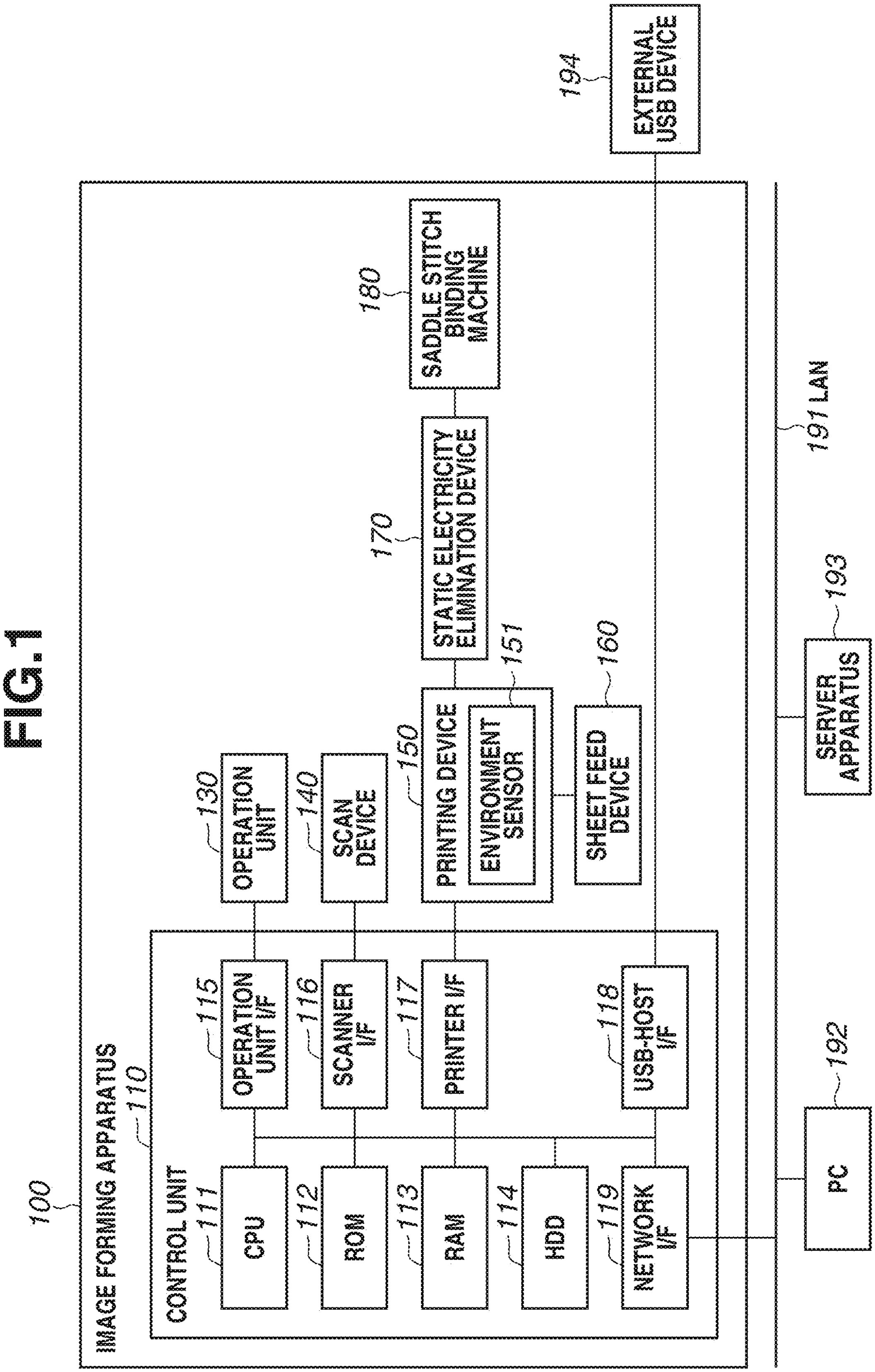
FIG. 1 is a block diagram illustrating a hardware configuration of an image forming apparatus according to an exemplary embodiment of the present disclosure.

FIG. 1 is a block diagram illustrating a hardware configuration of an image forming apparatus 100.

In FIG. 1, a control unit 110 is a component for controlling the entire image forming apparatus 100. The control unit 110 includes the following components for controlling the image forming apparatus 100.

A central processing unit (CPU) 111 reads control programs for the control unit 110 stored in a read-only memory (ROM) 112 to a random access memory (RAM) 113 and executes the read control programs.

The ROM 112 is a read-only memory storing a boot program of the control unit 110, Basic Input/Output System (BIOS), and fixed parameters.

The RAM 113 is a random access memory used to store programs and temporary data while the CPU 111 controls the control unit 110.

A hard disk drive (HDD) 114 stores print data received from a personal computer (PC) 192 via a network interface (network I/F) 119. Depending on the type of the image forming apparatus 100, a solid state drive (SSD) may be connected as a storage device in place of the HDD 114, and the role of the SSD as hardware is equivalent to that of the HDD 114. Depending on the type of the image forming apparatus 100, the HDD 114 may not be included.

The programs that the CPU 111 executes include a print application program. The print application program converts print data stored in the HDD 114 into image data printable by a printing device 150. Then, the image data printable by the printing device 150 is also stored in the HDD 114. Further, the programs that the CPU 111 executes also include a scan application program. The scan application program scans image data using a scan device 140, and the scanned image data is transferred to the HDD 114. Then, the scanned image data is stored in the HDD 114.

An operation unit interface (operation unit I/F) 115 is an interface (I/F) for transmitting instructions input by a user of the image forming apparatus 100 via an operation unit 130 to the CPU 111. Further, the operation unit I/F 115 receives details of a process for changing content displayed on the operation unit 130 from the CPU 111 and transmits the received details to the operation unit 130. The operation unit 130 includes a liquid crystal display unit with a touch panel function and a keyboard and receives user instructions.

A scanner I/F 116 is an interface for connecting the control unit 110 and the scan device 140 together. The scan device 140 (an input unit configured to input image data) scans an image on a document as image data using a line sensor composed of a charge coupled device (CCD). Then, the scan device 140 transfers the scanned image data to the HDD 114 via the scanner I/F 116. The image data transferred to the HDD 114 and stored in the HDD 114 is printable by the printing device 150, and copy processing can be performed by printing the image data scanned by the scan device 140 using the printing device 150.

A printer I/F 117 is an interface for connecting the control unit 110 and the printing device 150 together. The printing device 150 performs printing on a recording medium (sheet) based on image data transferred from the HDD 114 via the printer I/F 117.

The printing device 150 includes an environment sensor 151 and notifies the control unit 110 of values, such as a temperature and a humidity, of an installation environment of the image forming apparatus 100 via the printer I/F 117.

A universal serial bus (USB) host (USB-Host) I/F 118 is an interface for connecting the control unit 110 and an external USB device 194 together. An example of the external USB device 194 is a fax unit. In a case where the external USB device 194 is a fax unit, fax transmission is performed based on image data transferred from the HDD 114 via the USB-Host I/F 118. Further, image data is generated based on received data, and the image data is transferred to the HDD 114 via the USB-Host I/F 118. Image data stored in the HDD 114 is printed on a storage medium (sheet) by the printing device 150. Other examples of the external USB device 194 include a USB memory and a USB keyboard.

A network I/F 119 connects the control unit 110 to a local area network (LAN) 191 and performs communication with the PC 192 on the LAN 191. The PC 192 is connected to the image forming apparatus 100 via the LAN 191 and can transmit print data to the image forming apparatus 100 and operate the image forming apparatus 100 via a web browser. Furthermore, the image forming apparatus 100 is connected to a server apparatus 193 via the LAN 191 and communicates necessary data to execute functions of the image forming apparatus 100. Protocols for the communication are not limited and may be Hypertext Transfer Protocol (HTTP) or File Transfer Protocol (FTP). Depending on the installation environment of the image forming apparatus 100, the image forming apparatus 100 may not be connected to the PC 192 or the server apparatus 193.

The image forming apparatus 100 includes a sheet feed device 160 for storing sheets for use in printing processing. The sheet feed device 160 includes one or more sheet feed cassettes (each capable of storing, for example, 500 sheets), a sheet feed deck (capable of storing, for example, 5000 sheets), and a manual feed tray. Various sheets of different sizes and materials can be set separately in the sheet feed cassettes and the sheet feed deck. Further, various sheets including special sheets, such as overhead projector (OHP) sheets, can be set on the manual feed tray.

A static electricity elimination device 170 is a unit configured to perform a static electricity elimination process on conveyed sheets. A configuration of the static electricity elimination device 170 will be described below with reference to FIG. 3 and subsequent drawings.

A saddle stitch binding machine 180 is a unit configured to bind storage mediums printed by the printing device 150. The saddle stitch binding machine 180 performs sheet processing, such as saddle stitch binding, punching processing, trimming processing, shifted sheet discharging processing, folding processing, and stapling processing. Each foregoing job will be referred to as "saddle stitch binding job" herein.

In processing a saddle stitch binding job, a sheet printed by the printing device 150 based on the job is conveyed to the saddle stitch binding machine 180, and then the saddle stitch binding machine 180 performs sheet processing of the job. A sheet discharge destination of the saddle stitch binding machine 180 stores a printed material having undergone the sheet processing based on the saddle stitch binding job. There is a plurality of candidate sheet discharge destinations that are used in a case where the saddle stitch binding machine 180 is capable of performing a plurality of types of sheet processing and uses different sheet discharge destinations for different types of sheet processing.

A finisher unit configured to perform various types of finishing processing on recording mediums printed by the printing device 150 may be connected to the image forming apparatus 100 besides the saddle stitch binding machine 180. Examples of finisher units include a unit configured to perform stapling processing, punching processing, and/or saddle stitch binding processing on recording mediums printed by the printing device 150. Other examples include an inspection unit configured to scan a printed image again and check whether an intended image is correctly printed and a trimming unit configured to trim recording mediums. A plurality of option devices, as option units, are connected to a main body, and different types of finishing processing are realized by different devices (different units).

A finisher unit including the scan device 140, the sheet feed device 160, the static electricity elimination device 170, and the saddle stitch binding machine 180 can be attached and detached according to the purpose. The finisher unit may be attached as an additional option unit afterward or may be replaced due to malfunction.

Software Configuration

Figure 2:
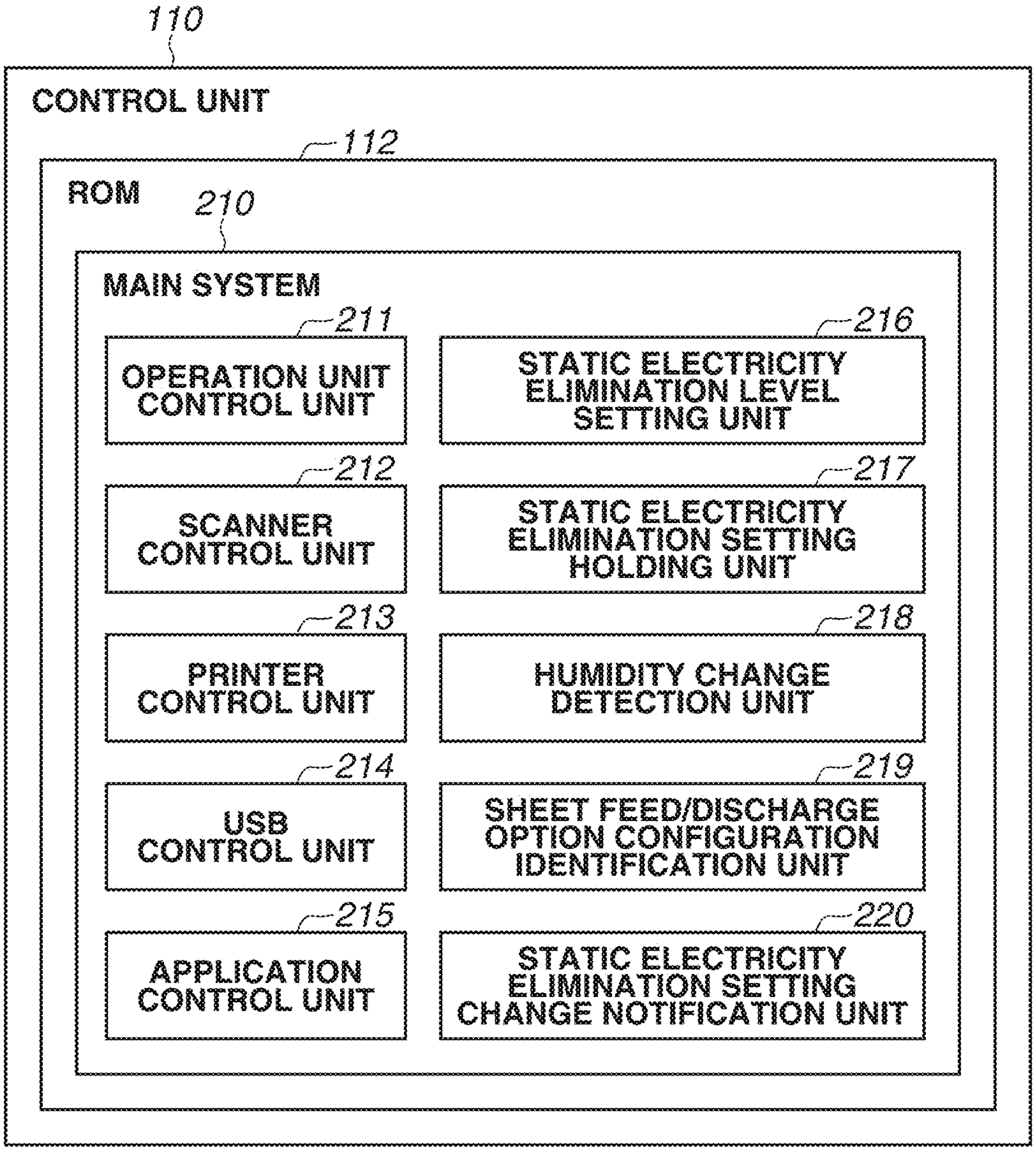
FIG. 2 is a diagram illustrating a software configuration of a control unit of the image forming apparatus according to an exemplary embodiment of the present disclosure.

Next, a configuration of software that the CPU 111 of the control unit 110 executes will be described below with reference to FIG. 2. Programs illustrated in FIG. 2 are stored in the ROM 112 in FIG. 1.

In a main system 210, programs for realizing various functions of the image forming apparatus 100 according to the present exemplary embodiment are placed.

An operation unit control unit 211 is a program for controlling the operation unit 130 via the operation unit I/F 115. Similarly, a scanner control unit 212 is a program for controlling the scan device 140 via the scanner I/F 116, and a printer control unit 213 is a program for controlling the printing device 150 via the printer I/F 117. Similarly, a USB control unit 214 is a program for controlling the external USB device 194 connected via the USB-Host I/F 118.

An application control unit 215 represents a group of programs for realizing various functions of the image forming apparatus 100. The application control unit 215 includes Hyper Text Transfer Protocol Daemon (httpd), Line Printer Daemon (lpd), a web browser function, and a device information distribution function.

A static electricity elimination level setting unit 216 is a program for enabling/disabling static electricity elimination control on each sheet based on an instruction issued by the user by operating the operation unit 130 or the PC 192 and for setting a static electricity elimination level (an adjusted value of charge for static electricity elimination). Sheets that may need the static electricity elimination control may be sheets that use a synthetic resin (plastic), such as thick paper, synthetic paper, and coated paper, and the default static electricity elimination control settings for the sheets are off (the static electricity elimination control is disabled).

A static electricity elimination setting holding unit 217 holds static electricity elimination level information set for each sheet by the static electricity elimination level setting unit 216. Holding the static electricity elimination level information set previously for a specific sheet makes it possible to perform the same static electricity elimination control in a case where the same sheet is specified again.

A humidity change detection unit 218 detects change in humidity during a predetermined period from an installation humidity of the image forming apparatus 100 measured by the environment sensor 151 or detects change in humidity up to the current time point after the static electricity elimination level is changed by the static electricity elimination level setting unit 216. A threshold may be predetermined for an amount of change in humidity (e.g., a case where there is a change of plus or minus 30% or more) or may be changed dynamically based on processing capability and usage history of the static electricity elimination device 170.

A sheet feed/discharge option configuration identification unit 219 identifies a sheet feed/discharge option unit configuration, such as the finisher unit including the sheet feed device 160, the static electricity elimination device 170, and the saddle stitch binding machine 180, and determines whether there is a change from the previous operation. Examples of changes in the sheet feed/discharge option unit configuration include a case where an additional option unit is introduced, a case where a unit is moved from another option unit of the main body, and a case where a unit is removed due to malfunction of the unit.

Figure 7:
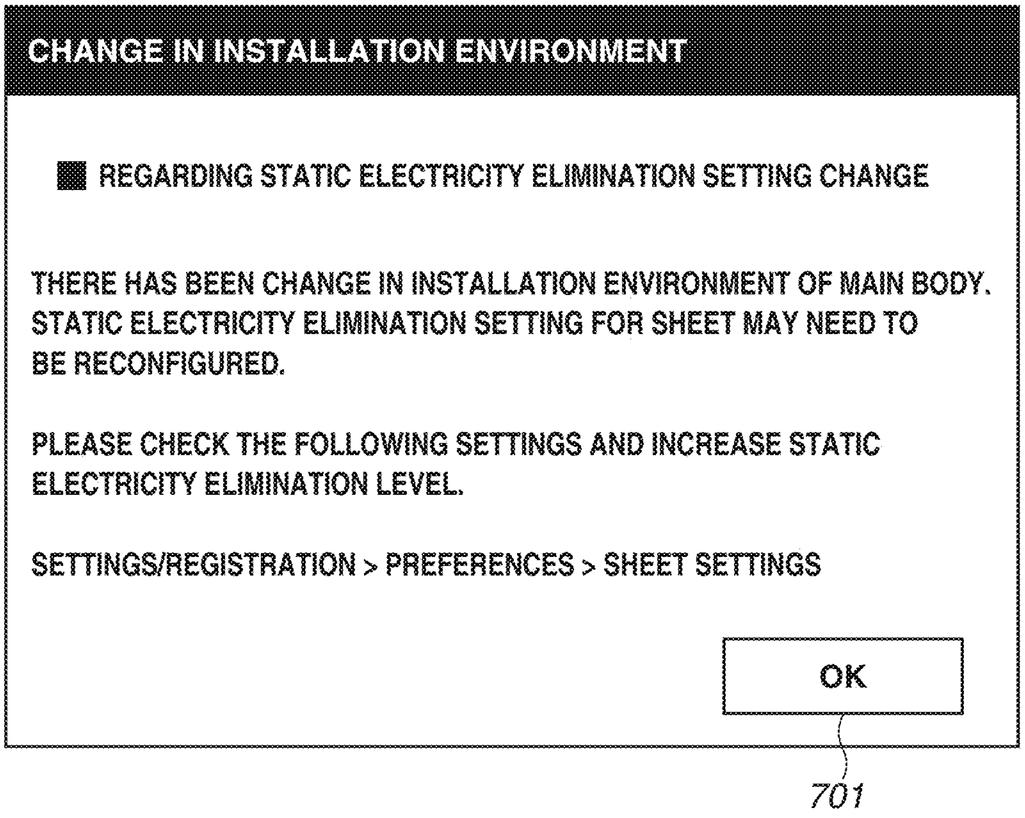
FIG. 7 illustrates an example of a static electricity elimination setting change screen that is notified in a case where a humidity change is detected according to an exemplary embodiment of the present disclosure.
Figure 8:
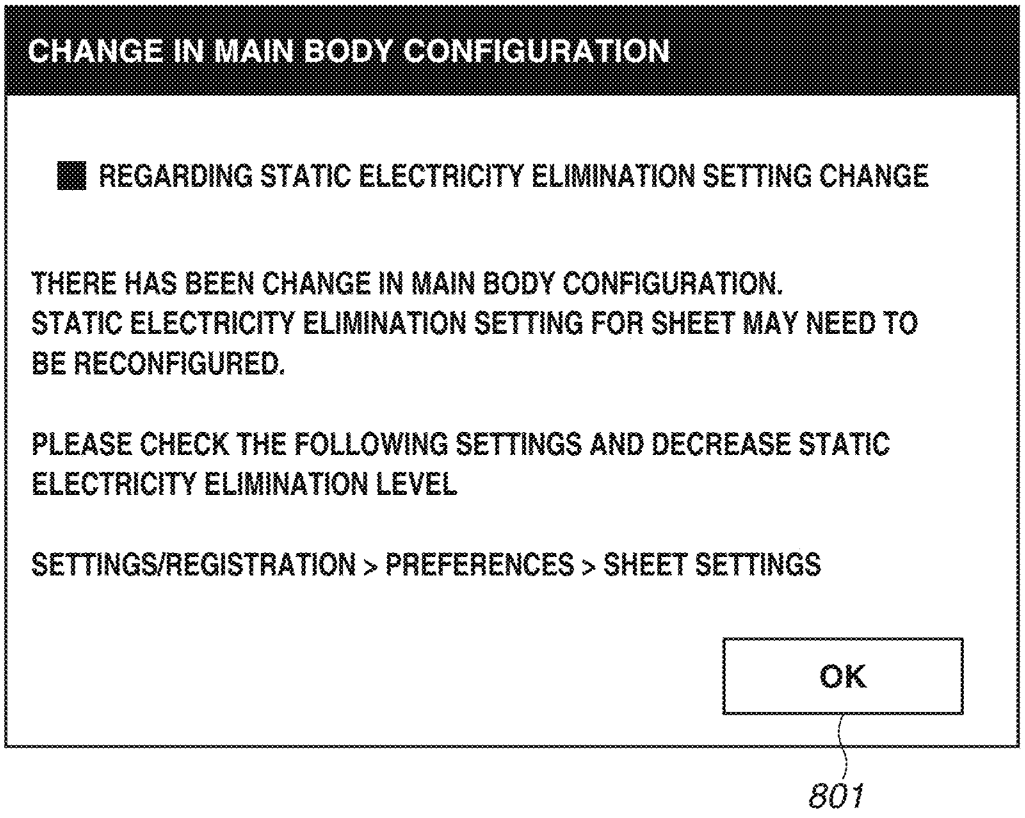
FIG. 8 illustrates an example of a static electricity elimination setting change screen that is notified in a case where a configuration change is detected according to an exemplary embodiment of the present disclosure.

A static electricity elimination setting change notification unit 220 determines content of a static electricity elimination setting change notification based on information detected by the humidity change detection unit 218 or the sheet feed/discharge option configuration identification unit 219 and provides the notification by displaying a screen illustrated in FIG. 7 or FIG. 8 on the operation unit 130. Depending on the installation environment of the image forming apparatus 100, the notification of the change in the setting may also be provided to the PC 192 and/or the server apparatus 193 via the network I/F 119 in addition to the display of the notification on the screen of the operation unit 130.

In a case where the air becomes dry, discharge from moisture on sheet surfaces disappears, and the amount of charge increases, so that static electricity becomes more likely to occur. In a case where the humidity is high, sheet surfaces are coated with moisture, and discharge occurs gradually, so that static electricity becomes less likely to occur. The content of the static electricity elimination setting change notification by the static electricity elimination setting change notification unit 220 is determined so that in a case where the humidity detected by the humidity change detection unit 218 has decreased by a predetermined amount, the static electricity elimination level is increased, whereas in a case where the detected humidity has increased by a predetermined amount, the static electricity elimination level is decreased.

The longer the conveyance path for a sheet conveyed through a sheet feed/discharge option unit is, the more the discharge occurs, and the amount of static charge on the sheet decreases, so that an appropriate static electricity elimination level becomes low. The content of the static electricity elimination setting change notification by the static electricity elimination setting change notification unit 220 is determined so that in a case where the conveyance path becomes longer than that in the previous operation due to the configuration change identified by the sheet feed/discharge option configuration identification unit 219, the static electricity elimination level is decreased, whereas in a case where the conveyance path becomes shorter, the static electricity elimination level is increased.

Hardware Configuration of Static Electricity Elimination Device

Figure 3:
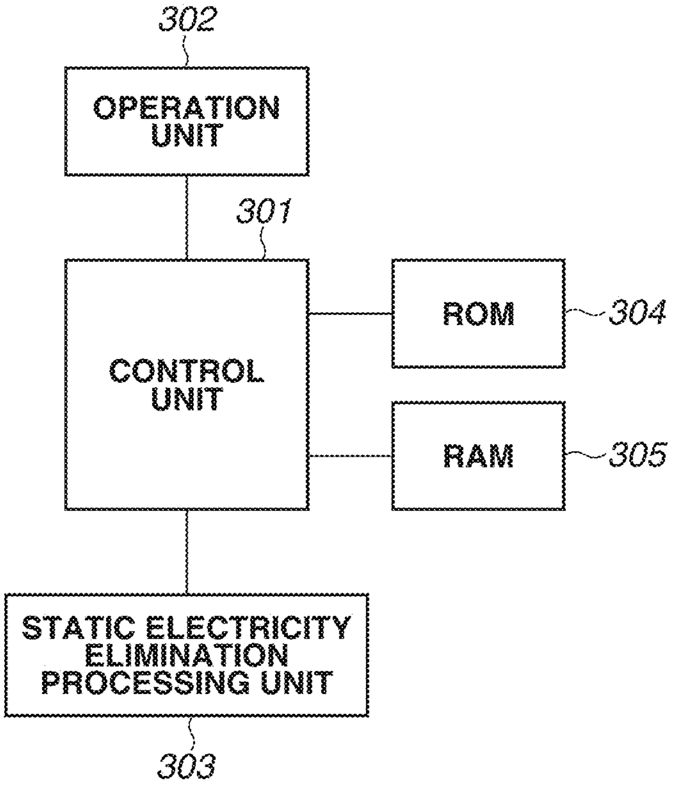
FIG. 3 is a diagram illustrating a hardware configuration of a static electricity elimination device according to an exemplary embodiment of the present disclosure.

FIG. 3 is a configuration diagram illustrating a hardware configuration of the static electricity elimination device 170 according to the present exemplary embodiment.

A static electricity elimination processing unit 303 is composed of a static electricity elimination roller 502, an ionizer 503, and a voltage application controller 501 for the static electricity elimination roller 502 and the ionizer 503 and performs the static electricity elimination process on conveyed sheets. The voltage application controller 501, the static electricity elimination roller 502, and the ionizer 503 will be described below.

A control unit 301 is a CPU configured to realize control to apply a voltage to the static electricity elimination roller 502 and the ionizer 503 via the voltage application controller 501.

A ROM 304 stores a boot program of the static electricity elimination device 170, control programs of an operation unit 302, and a program of the static electricity elimination process of the static electricity elimination processing unit 303. The control unit 301 being a CPU reads a necessary program as needed from the ROM 304 to a RAM 305 and executes the read program.

(Operation Unit of Static Electricity Elimination Device)

Figure 4:
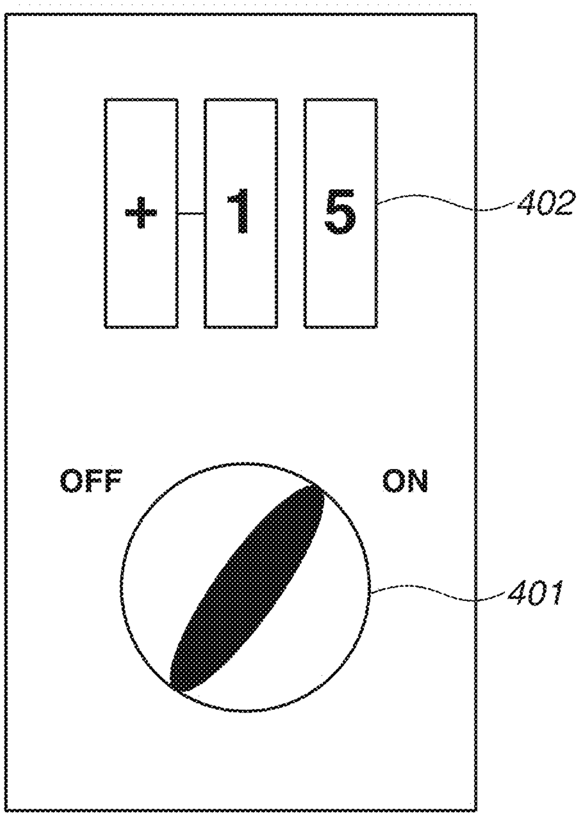
FIG. 4 illustrates an example of an operation unit of the static electricity elimination device according to an exemplary embodiment of the present disclosure.

FIG. 4 is a diagram illustrating a configuration of the operation unit 302 of the static electricity elimination device 170 according to the present exemplary embodiment.

The user can configure settings for the static electricity elimination device 170 via the operation unit 302 of the static electricity elimination device 170. A mode setting switch 401 in FIG. 4 is a switch for enabling/disabling (ON/OFF) the static electricity elimination by the static electricity elimination device 170, and in a case where the switch 401 is on, the control unit 301 controls the static electricity elimination processing unit 303, which will be described below, to perform the static electricity elimination process.

Further, an adjustment dial 402 composed of a thumb rotary switch is used to adjust the intensity of the static electricity elimination control that is performed in a case where the mode setting switch 401 is on, and the control unit 301 controls the adjustment dial 402 so that the adjustment dial 402 is enabled only in a case where the mode setting switch 401 is on.

In a case where the static electricity elimination setting for the static electricity elimination device 170 is set via the operation unit 302 illustrated in FIG. 4, the static electricity elimination control is performed on all conveyed sheets. The static electricity elimination setting may be made individually for each sheet via the static electricity elimination level setting unit 216 of the control unit 110.

According to an exemplary embodiment, the operation unit 302 of the static electricity elimination device 170 may be omitted and the setting can be configured only via the static electricity elimination level setting unit 216 of the control unit 110, or the static electricity elimination level setting unit 216 may be omitted and the setting can be configured only via the operation unit 302.

(Static Electricity Elimination Process)

Figure 5:
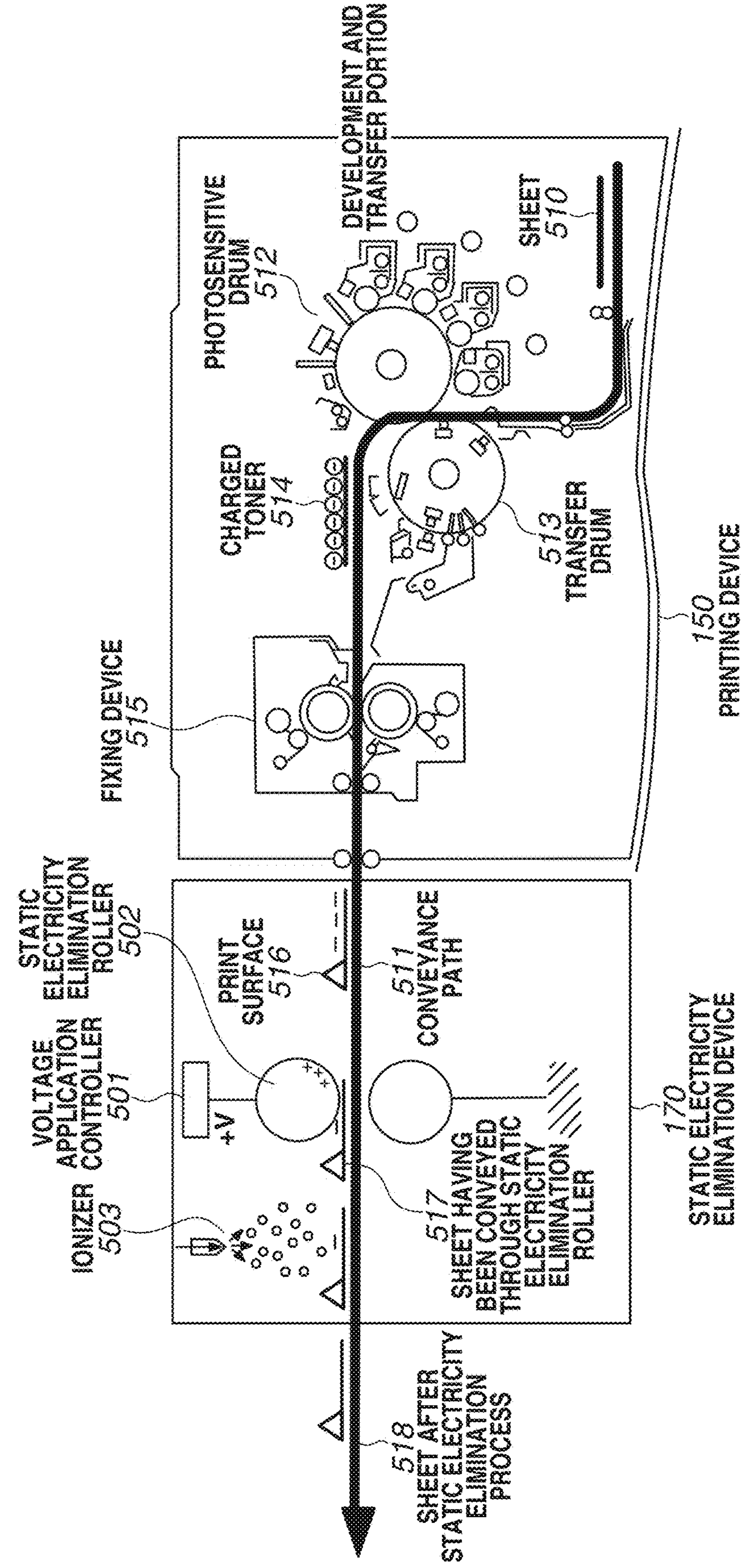
FIG. 5 is a schematic diagram illustrating a static electricity elimination process by the static electricity elimination device according to an exemplary embodiment of the present disclosure.

The static electricity elimination process that the static electricity elimination processing unit 303 performs will be described below with reference to FIG. 5. FIG. 5 is a diagram schematically illustrating how the static electricity elimination device 170 performs the static electricity elimination process on a sheet having undergone a printing process by the image forming apparatus 100.

First, a sheet 510 is conveyed along a conveyance path 511 to a development and transfer portion formed by a photosensitive drum 512 and a transfer drum 513, and toner is placed on the sheet 510. Charged toner 514 placed on the sheet 510 is negatively charged, and after the sheet 510 is fixed by a fixing device 515 thereafter, the resulting sheet with a print surface 516 in a negatively charged state is conveyed to the static electricity elimination device 170. The static electricity elimination device 170 includes the static electricity elimination roller 502 positively charged, and by bringing the static electricity elimination roller 502 into contact with the print surface 516 negatively charged, the static electricity elimination device 170 applies positive charge to the print surface 516 to cancel the charged state. Negative charge that the static electricity elimination process by the static electricity elimination roller 502 fails to eliminate or positive charge may remain on a sheet 517 having been conveyed along the static electricity elimination roller 502. Thus, the static electricity elimination device 170 according to the present exemplary embodiment includes the ionizer 503 downstream of the static electricity elimination roller 502. The ionizer 503 is a device that applies voltage to an electrode needle in the ionizer 503 to generate corona discharge and neutralizes charge with ions generated by the corona discharge. As described above, the static electricity elimination roller 502 roughly eliminates static electricity, and then the ionizer 503 adjusts residual charge, whereby a sheet 518 having exited from the static electricity elimination device 170 after the static electricity elimination process is no longer discharged.

The static electricity elimination device 170 includes the static electricity elimination roller 502 and a roller paired with the static electricity elimination roller 502. A sheet conveyed into the static electricity elimination device 170 is sandwiched by the pair of rollers and conveyed, and the static electricity elimination roller 502 roughly performs static electricity elimination on the sheet as described above. Thereafter, the ionizer 503 performs the static electricity elimination process to remove residual charge from the sheet while the sheet is conveyed to the outside of the apparatus by conveyance rollers.

Static Electricity Elimination Setting Change Notification Process

Next, a process for a static electricity elimination setting change notification by the image forming apparatus 100 according to the present exemplary embodiment will be described below with reference to a flowchart in FIG. 6. A program for realizing operations described in the flowchart is stored in the ROM 112, and the CPU 111 loads the program to the RAM 113 and executes the program.

Figure 6:
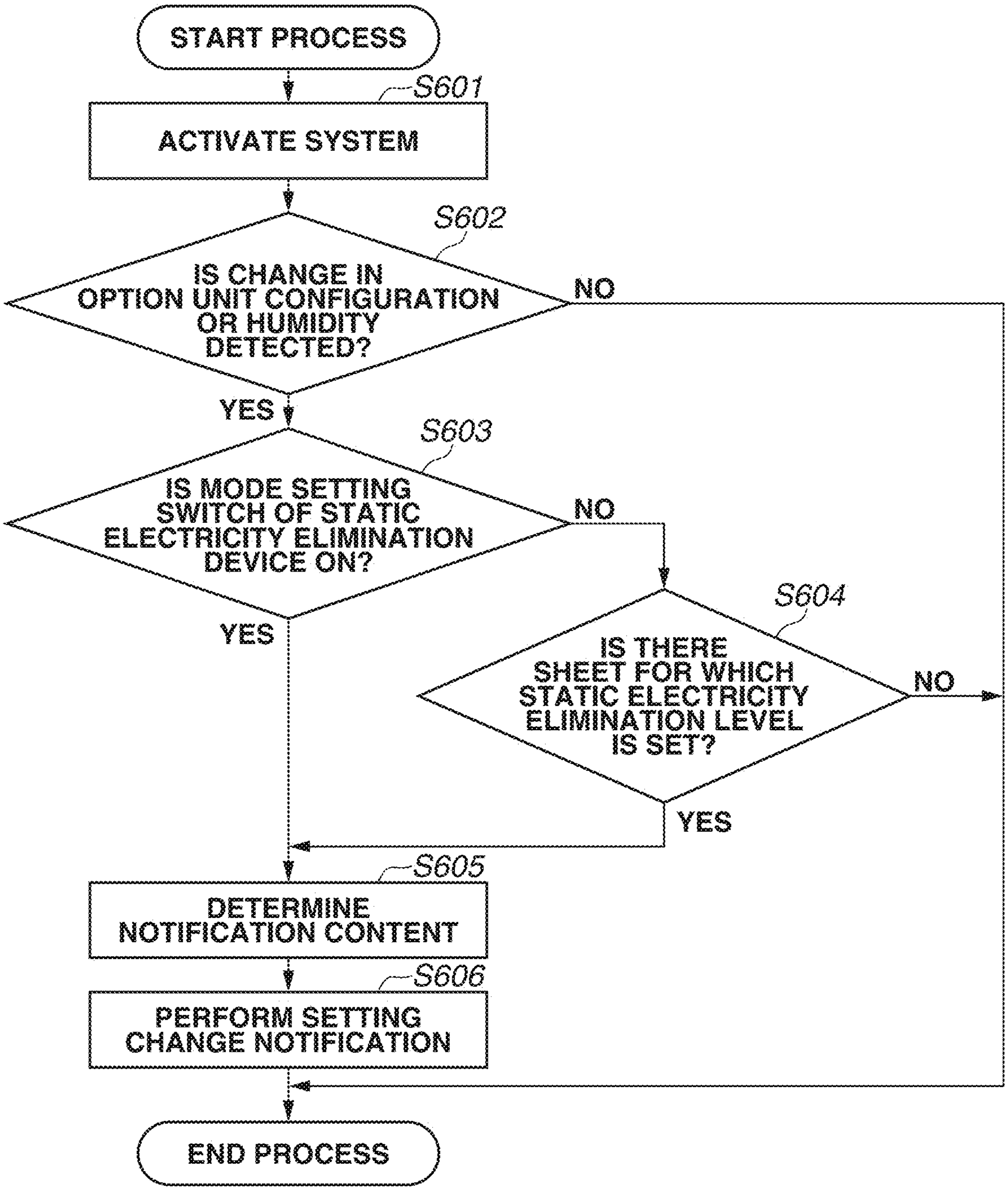
FIG. 6 is a flowchart for executing a notification of a static electricity elimination setting change according to an exemplary embodiment of the present disclosure.

The flowchart in FIG. 6 starts in a case where the image forming apparatus 100 performs system activation in step S601. While a trigger for the system activation is generally a case where a power switch is changed from off to on, the system activation may be triggered by reactivation of the system due to a factor.

Next, in step S602, whether a change in humidity is detected by the humidity change detection unit 218 or a change in option unit configuration is detected by the sheet feed/discharge option configuration identification unit 219 is determined.

In a case where it is determined that a change in humidity or sheet feed/discharge option unit configuration is detected (YES in step S602), the processing proceeds to step S603, whereas in a case where no change in humidity or sheet feed/discharge option unit configuration is detected (NO in step S602), the process ends.

As to a change in humidity detected by the humidity change detection unit 218, in a case where, for example, the humidity in the previous static electricity elimination setting is 50% and the detected humidity is 20%, the amount of static charge on the sheet is expected to increase due to dryness. In this case, the processing proceeds to step S603.

As to a change in option unit configuration detected by the sheet feed/discharge option configuration identification unit 219, in a case where, for example, an inspection unit is additionally connected as an option unit, the conveyance path becomes longer, and the amount of static charge on the sheet by discharge is expected to decrease. In this case, the processing proceeds to step S603.

In step S603, whether the mode setting switch 401 of the static electricity elimination device 170 is on is determined.

In a case where the mode setting switch 401 is on (YES in step S603), the processing proceeds to step S605. On the other hand, in a case where the mode setting switch 401 is off (NO in step S603), the processing proceeds to step S604.

In step S604, whether a static electricity elimination level is set for any of the sheets by the static electricity elimination level setting unit 216 and information thereon is held by the static electricity elimination setting holding unit 217 is checked. Specifically, whether information about a sheet for which a static electricity elimination level is set is held is checked. In step S604, in a case where it is determined that there is no sheet for which a static electricity elimination level is set (NO in step S604), the static electricity elimination function is originally not used, so that the process ends. On the other hand, in a case where there is a sheet for which a static electricity elimination level is set (YES in step S604), the processing proceeds to step S605.

In a case where the static electricity elimination setting is set in step S603 or S604, an appropriate amount of static electricity elimination for the set static electricity elimination level may have changed due to the change in humidity or configuration, so that in order to determine notification content, the processing proceeds to step S605.

In step S605, the CPU 111 determines content of a static electricity elimination setting change notification. Specifically, in a case where the humidity has decreased by a predetermined amount due to a humidity change, the CPU 111 determines the content of the notification to increase the static electricity elimination level, whereas in a case where the humidity has increased by a predetermined amount due to a humidity change, the CPU 111 determines the content of the notification to decrease the static electricity elimination level. Further, as to a change in configuration detected by the sheet feed/discharge option configuration identification unit 219, in a case where the conveyance path becomes longer than that in the previous operation, the CPU 111 determines the content of the notification to decrease the static electricity elimination level, whereas in a case where the conveyance path becomes shorter, the CPU 111 determines the content of the notification to increase the static electricity elimination level.

Thereafter, in step S606, the notification content determined in step S605 is displayed on a display screen of the operation unit 130 (examples of the display screen will be described below with reference to FIGS. 7 and 8), and the process ends.

While the operation unit 130 displays a screen in the above-described example according to the present exemplary embodiment, depending on the installation environment of the image forming apparatus 100, the setting change notification may also be provided to the PC 192 and/or the server apparatus 193 in addition to the display of the screen on the operation unit 130.

(Setting Change Notification Screen due to Humidity Change)

Next, a screen that is displayed on the operation unit 130 in a case where it is determined that the static electricity elimination setting needs to be changed due to a humidity change will be described below with reference to FIG. 7.

In a case where a change in humidity is detected by the humidity change detection unit 218 and the static electricity elimination setting is confirmed as being enabled and the detected change is a decrease in humidity by a predetermined amount, the operation unit 130 displays the screen illustrated in FIG. 7. In a case where the humidity has decreased (it is drier than before), the amount of static charge on a conveyed sheet is expected to increase, so that a notification indicating that the static electricity elimination level needs to be increased via the sheet setting is provided. In the example of the screen in FIG. 7, only an [OK] button 701 is displayed, and the screen closes in a case where the user presses the [OK] button 701. A button for switching to a sheet setting screen may also be displayed in addition to the [OK] button 701.

(Setting Change Notification Screen due to Option Unit Configuration Change)

Next, a screen that is displayed on the operation unit 130 in a case where it is determined that the static electricity elimination setting needs to be changed due to an option unit configuration change will be described below with reference to FIG. 8.

In a case where a change in option unit configuration is detected by the sheet feed/discharge option configuration identification unit 219 and the static electricity elimination setting is confirmed as being enable and the conveyance path becomes longer, the operation unit 130 displays the screen illustrated in FIG. 8. In a case where the conveyance path becomes longer (a new sheet feed/discharge option unit is added), the amount of static charge is expected to decrease due to discharge during conveyance, so that a notification indicating that the static electricity elimination level needs to be decreased via the sheet setting is provided. In the example of the screen in FIG. 8, only an [OK] button 801 is displayed, and the screen closes in a case where the user presses the [OK] button 801. A button for switching to a sheet setting screen may also be displayed in addition to the [OK] button 801.

The operation unit 130 displays the screen in FIG. 7 or FIG. 8 to notify the user that an appropriate amount of static electricity elimination for the set static electricity elimination level may have changed, whereby the user can recognize that the static electricity elimination setting needs to be checked.

As described above, the present exemplary embodiment prevents execution of printing processing or static electricity elimination control in a state where an inappropriate charge adjustment value is set for the sheet in a case where an appropriate amount of static electricity elimination has changed due to a humidity change or a configuration change, thereby reducing the risks of generating a deliverable that will become waste paper.

While humidity is described above as an example of an environmental change that significantly affects the static electricity elimination process according to the above-described exemplary embodiment, another environment parameter such as temperature or air pressure or a combination thereof may be used.

OTHER EMBODIMENTS

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-075693, which was filed on May 1, 2023 and which is hereby incorporated by reference herein in its entirety.

What is claimed is:

1. A printing system comprising:

a printing device configured to print an image on a sheet;

a static electricity elimination device configured to perform static electricity elimination on the sheet with the image printed on the sheet by the printing device;

a sensor configured to detect humidity;

at least one memory that stores instructions; and at least one processor, wherein the at least one processor causes, by executing the instructions, the printing system to:

notify a user to change a setting value of the static electricity elimination by the static electricity elimination device in a case where the humidity detected by the sensor has changed.

2. The printing system according to claim 1, wherein in a case where the humidity detected by the sensor has decreased by a predetermined value, the at least one processor further causes the printing system to notify the user to increase an amount of the static electricity elimination by the static electricity elimination device.

3. The printing system according to claim 2, wherein the at least one processor further causes the printing system to:

set whether to enable the static electricity elimination by the static electricity elimination device; and in the case where the humidity detected by the sensor has decreased by the predetermined value, notify the user to increase the amount of the static electricity elimination by the static electricity elimination device based on a setting made to enable the static electricity elimination by the static electricity elimination device.

4. The printing system according to claim 1, wherein the at least one processor further causes the printing system to:

determine whether a configuration of the printing system has been changed; and in a case where the configuration of the printing system has been changed, notify the user to change the setting value of the static electricity elimination by the static electricity elimination device.

5. The printing system according to claim 4, wherein, in a case where an option device that extends a conveyance path for the sheet is connected to the printing system, the at least one processor further causes the printing system to determine that the configuration of the printing system has been changed.

6. The printing system according to claim 1, wherein the printing device transfers the image to a predetermined surface of the sheet using a negatively charged recording material, and the static electricity elimination device performs the static electricity elimination on the sheet by applying positive charge to the predetermined surface.

7. The printing system according to claim 1, further comprising an ionizer configured to remove residual charge on the sheet having undergone the static electricity elimination by the static electricity elimination device using an ion.

8. A method for controlling a printing system, the method comprising:

printing an image on a sheet;

performing static electricity elimination on the sheet with the image printed on the sheet;

detecting humidity; and notifying a user to change a setting value of the static electricity elimination in a case where the detected humidity has changed.

9. A non-transitory computer-readable storage medium storing computer-executable instructions for causing a computer to execute a method for controlling a printing system, the method comprising:

printing an image on a sheet;

performing static electricity elimination on the sheet with the image printed on the sheet;

detecting humidity; and notifying a user to change a setting value of the static electricity elimination in a case where the detected humidity has changed.

* * * * *